US010323599B2

(12) United States Patent
Dudar

(10) Patent No.: US 10,323,599 B2
(45) Date of Patent: Jun. 18, 2019

(54) SECONDARY SYSTEM AND METHOD FOR CONTROLLING AN ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 15/264,350

(22) Filed: Sep. 13, 2016

(65) Prior Publication Data

US 2018/0073449 A1    Mar. 15, 2018

(51) Int. Cl.
*F02D 41/00*     (2006.01)
*F02D 41/22*     (2006.01)
*F02M 35/08*     (2006.01)

(52) U.S. Cl.
CPC ......... *F02D 41/22* (2013.01); *F02D 41/0002* (2013.01); *F02D 41/0035* (2013.01); *F02D 2200/602* (2013.01); *F02D 2200/703* (2013.01); *F02M 35/08* (2013.01); *Y02T 10/42* (2013.01)

(58) Field of Classification Search
CPC .. F02D 41/22; F02D 41/0035; F02D 41/0002; F02D 2200/703; F02D 2200/602; F02M 35/09; F02M 25/0854; F02M 25/0809; F02M 25/0836; F02M 25/08; F02M 25/089
USPC .................................. 123/518–520; 701/103
See application file for complete search history.

(56) References Cited

U.S. PATENT DOCUMENTS

| | | | | |
|---|---|---|---|---|
| 4,029,073 A | * | 6/1977 | Dey | F02D 17/04 123/198 D |
| 4,323,522 A | * | 4/1982 | Rasmussen | F02B 63/02 261/72.1 |
| 4,522,176 A | * | 6/1985 | Takao | F02D 31/005 123/339.24 |
| 4,700,674 A | * | 10/1987 | Iwata | F02D 31/005 123/327 |
| 4,962,744 A | * | 10/1990 | Uranishi | F02M 25/0809 123/198 D |
| 5,367,997 A | | 11/1994 | Kawamura et al. | |
| 5,495,749 A | * | 3/1996 | Dawson | F02M 25/0818 73/114.39 |
| 5,540,205 A | * | 7/1996 | Davis | F02D 43/00 123/486 |

(Continued)

OTHER PUBLICATIONS

Dudar, Aed M., "Secondary System and Method for Controlling an Engine," Filed Sep. 13, 2016, U.S. Appl. No. 15/264,291, 28 pages.

*Primary Examiner* — Sizo B Vilakazi
*Assistant Examiner* — Brian R Kirby
(74) *Attorney, Agent, or Firm* — Julia Voutyras; McCoy Russell LLP

(57) ABSTRACT

Systems and methods for operating an engine in response to a condition where air flow into an engine via an air filter of an engine air intake is limited are presented. In one example, a canister purge valve is adjusted responsive to accelerator pedal position to reduce engine torque reduction that may be caused by a partially clogged air filter or lower barometric pressure. In this way, the engine air amount may be adjusted to provide additional torque from an engine while engine air flow through the air filter may be limited.

20 Claims, 4 Drawing Sheets

(56) References Cited

U.S. PATENT DOCUMENTS

| | | | | |
|---|---|---|---|---|
| 5,816,222 A * | 10/1998 | Kidokoro | ............ | F02M 25/0809 123/520 |
| 6,105,556 A * | 8/2000 | Takaku | .............. | F02M 25/0809 123/198 D |
| 6,129,071 A | 10/2000 | Pursifull | | |
| 6,363,921 B1 * | 4/2002 | Cook | ................. | F02M 25/0809 123/519 |
| 8,397,500 B2 * | 3/2013 | Andrasko | ............... | F02D 23/00 60/605.1 |
| 8,959,910 B2 * | 2/2015 | Rollinger | ................ | F02D 41/22 60/602 |
| 9,739,239 B2 * | 8/2017 | Dudar | ................. | F02M 25/0827 |
| 2001/0011539 A1 * | 8/2001 | Ito | ........................ | F02M 25/089 123/518 |
| 2008/0190177 A1 * | 8/2008 | Wiggins | ............. | B01D 46/0086 73/49.7 |
| 2009/0056662 A1 * | 3/2009 | Vogt | .......................... | F02M 1/16 123/179.9 |
| 2009/0276128 A1 | 11/2009 | Whitney et al. | | |
| 2010/0012099 A1 * | 1/2010 | Kerns | ................. | F02D 41/0042 123/520 |
| 2011/0197580 A1 * | 8/2011 | Andrasko | ................ | F02D 23/00 60/602 |
| 2011/0238331 A1 * | 9/2011 | Moore | .................... | F02D 41/18 702/47 |
| 2011/0308308 A1 * | 12/2011 | Herman | ................ | F02M 35/09 73/114.31 |
| 2012/0016566 A1 * | 1/2012 | Cunningham | .......... | F02D 37/02 701/103 |
| 2012/0215399 A1 * | 8/2012 | Jentz | ..................... | G01M 3/025 701/32.8 |
| 2013/0036804 A1 * | 2/2013 | Uehara | .................. | F02M 35/09 73/114.31 |
| 2013/0112176 A1 * | 5/2013 | Peters | ................ | F02M 25/0809 123/521 |
| 2013/0253799 A1 * | 9/2013 | Peters | ................ | F02M 25/0818 701/102 |
| 2013/0269660 A1 * | 10/2013 | Peters | .................... | F02M 25/08 123/520 |
| 2014/0000255 A1 * | 1/2014 | Suzuki | ...................... | F02D 9/02 60/599 |
| 2014/0026866 A1 * | 1/2014 | Pifher | .................... | F02M 33/02 123/520 |
| 2014/0102421 A1 * | 4/2014 | Kato | ................. | F02M 25/0818 123/520 |
| 2014/0114550 A1 * | 4/2014 | Bohr | ................. | F02D 41/0037 701/102 |
| 2014/0297161 A1 * | 10/2014 | Stanek | .................... | F02D 41/30 701/104 |
| 2014/0311461 A1 * | 10/2014 | Dudar | ................ | F02M 25/0818 123/520 |
| 2014/0374177 A1 * | 12/2014 | Yang | .................... | B60K 15/035 180/65.21 |
| 2015/0114360 A1 * | 4/2015 | Werner | ................ | F02M 25/0809 123/520 |
| 2015/0120108 A1 * | 4/2015 | Dudar | .................. | F02M 25/089 701/22 |
| 2015/0354510 A1 * | 12/2015 | Dudar | ................ | F02M 25/0818 73/40.7 |
| 2015/0369150 A1 * | 12/2015 | Dudar | ................ | F02M 25/0836 123/519 |

* cited by examiner

SECONDARY SYSTEM AND METHOD FOR CONTROLLING AN ENGINE

FIELD

The present description relates to a system and methods for operating an engine during conditions of limited engine air flow. The system and methods provide for an alternative way of controlling an engine air amount so that vehicle performance may be reduced less significantly during conditions of limited engine air flow.

BACKGROUND AND SUMMARY

Engine air flow may be controlled via a central or primary throttle that regulates air flow from an air filter of an engine air intake into an engine intake manifold and engine cylinders. The throttle may include an electric actuator, such as a motor, to regulate a position of a throttle plate of a butterfly valve. The position of the throttle may be based on a position of an accelerator pedal and vehicle speed. In particular, the accelerator pedal position may be converted into a driver demand torque and the driver demand torque is converted into an engine air flow amount and a fuel flow amount that provides the driver demand torque. However, if the vehicle in which the engine operates is driven to higher altitudes where barometric pressure is lower than at sea level, engine torque may not meet driver demand torque because air is less dense at higher altitudes and because the engine air intake may restrict the less dense air from entering the engine. Further, if an engine air intake filter upstream of the throttle is partially obstructed by debris, engine performance may be reduced more than is desired at low altitudes.

The inventor herein has recognized the above-mentioned limitations and has developed an engine control method, comprising: opening a fuel vapor storage canister vent valve and closing a fuel tank vapor blocking valve via a controller in response to an indication of barometric pressure less than a first threshold and a driver demand torque greater than a second threshold.

By adjusting operating states of devices in a fuel vapor control system, it may be possible to provide the technical result of improving engine air flow at higher altitudes where barometric pressure is lower so that engine performance degradation may be reduced. For example, a fuel tank vapor blocking valve may be closed and the fuel vapor storage canister vent valve may be opened to prevent fuel vapors from flowing to the engine while air flows to the engine via a passage leading from atmosphere through a fuel vapor storage canister and to the engine intake manifold. Further, air may continue to flow into the engine via a throttle. Thus, an additional air passage into the engine that may be less restrictive, may improve air flow into the engine at higher engine loads. Further, a canister purge valve may be operated proportionately to accelerator pedal position during conditions when an air filter of the engine is partially cogged and in a degraded state.

The present description may provide several advantages. Specifically, the approach may provide improved vehicle drivability during conditions of low barometric pressure. Additionally, the approach also includes for increasing engine air flow during some conditions when an air filter is degraded so that driver demand torque may be more closely followed. Further, the approach may be performed without need for additional engine hardware.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
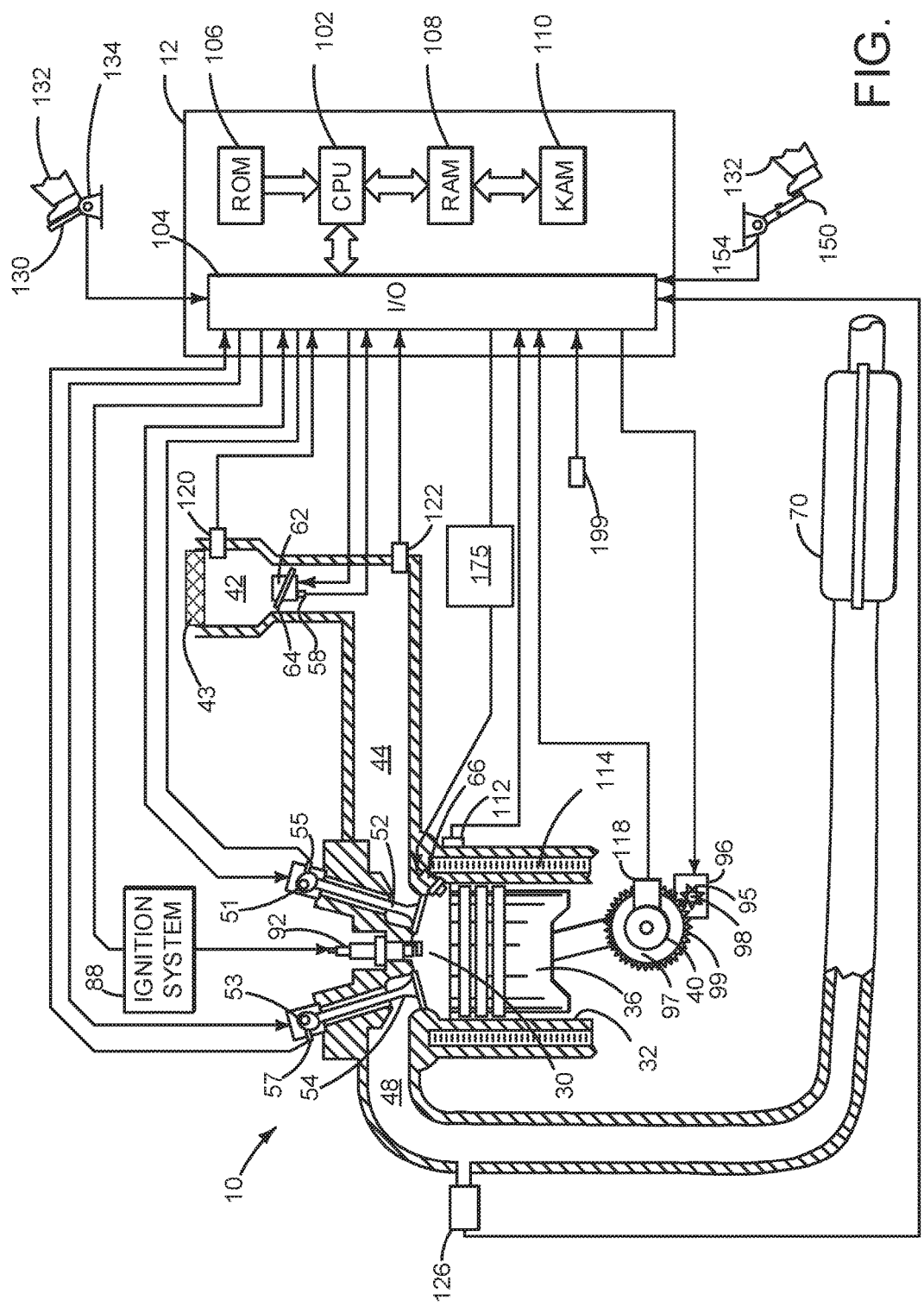
FIG. 1 is a schematic diagram of an engine.
Figure 2:
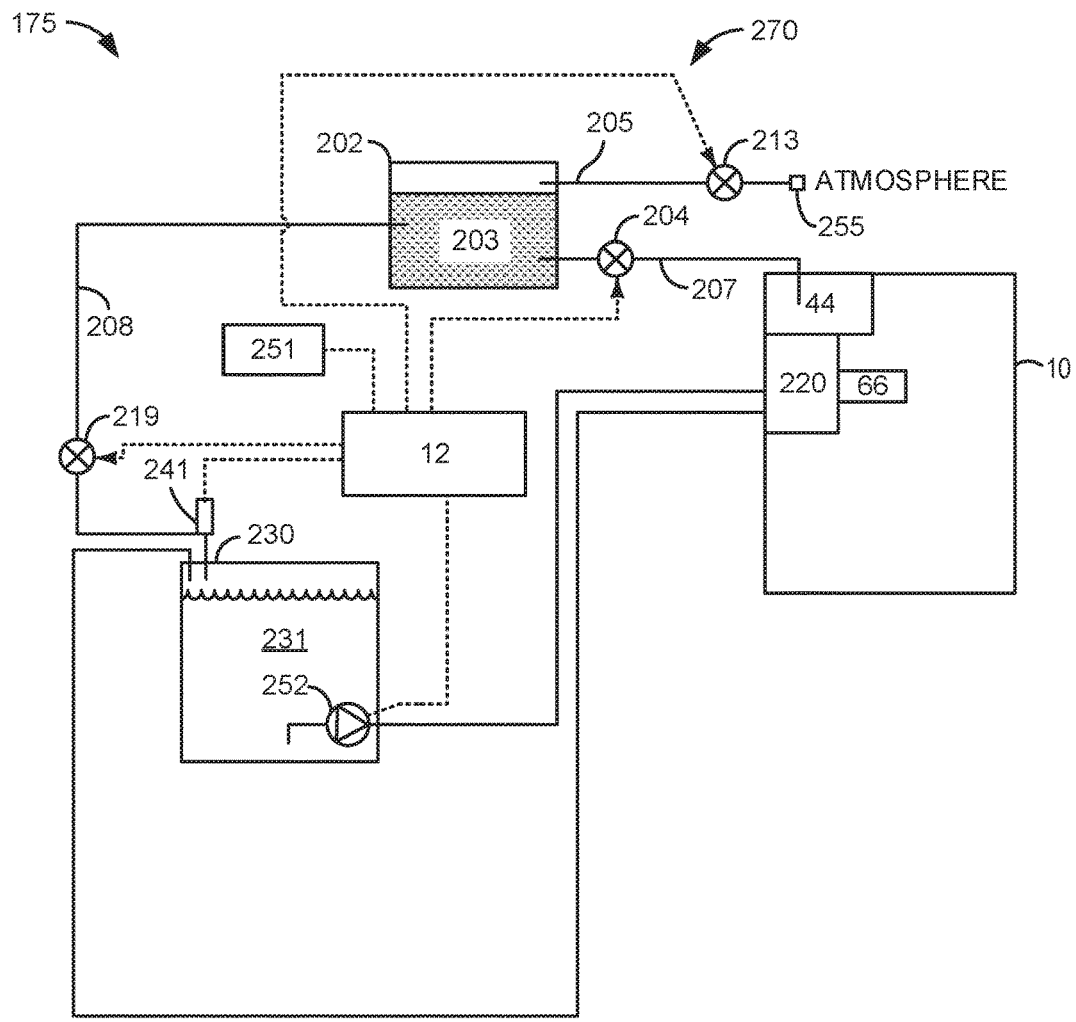
FIG. 2 is a schematic diagram of an example evaporative emissions system.
Figure 3:
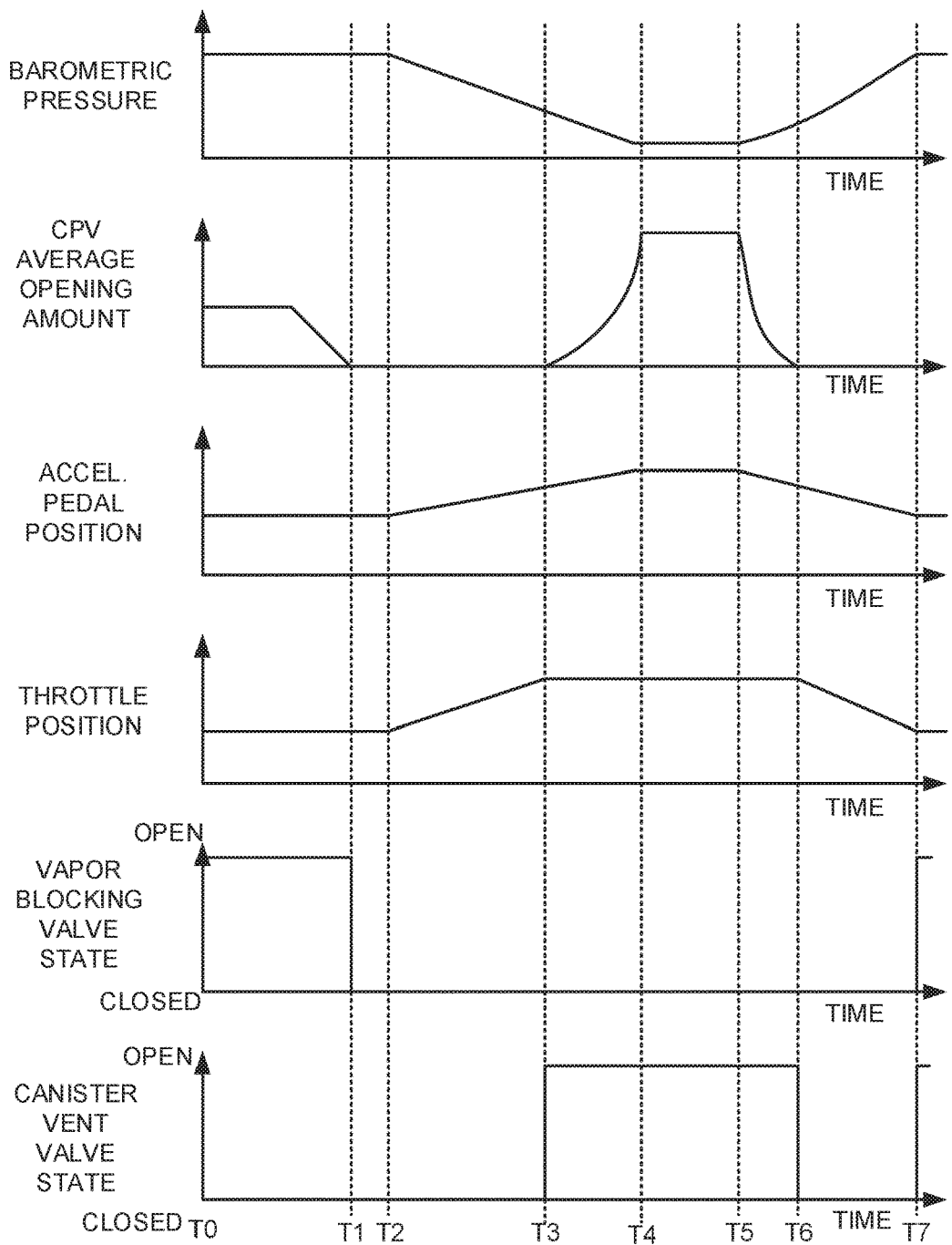
FIG. 3 shows plot of an example prophetic engine operating sequence.

The present description is related to improving engine operation and vehicle drivability during conditions where engine air flow may be limited. A vehicle may include an evaporative emissions system that includes a fuel vapor storage canister that is positioned between an atmospheric port and an engine. The engine may be configured as shown in FIG. 1. The engine may be supplied with fuel vapors from time to time via the fuel vapor control system as is shown in FIG. 2. Engine air flow may be controlled as shown in the sequence of FIG. 3. The sequence shown in FIG. 3 may be provided according to the method of FIG. 4 in cooperation with the system of FIGS. 1 and 2.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIG. 2. In addition, intake manifold 44 is shown communicating with optional electronic throttle 62 (e.g., central throttle which may be a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed via sensor 199 for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example fuel system 175 is shown in detail. The fuel system of FIG. 2 may supply fuel to engine 10 shown in detail in FIG. 1. Fuel system 175 includes evaporative emission system 270. The system of FIG. 2 may be operated according to the method of FIG. 4. Fuel system components and fluidic conduits are shown as solid lines and electrical connections are shown as dashed lines. The conduits represented by solid lines provide fluidic communication between devices linked by the conduits. Further, the conduits are coupled to the devices from which and to which they lead.

Evaporative emissions system 270 includes a fuel vapor storage canister 202 for storing fuel vapors. Evaporative emissions system 270 also includes carbon 203 for storing and releasing fuel vapors. Fuel vapor storage canister 202 is shown including atmospheric vent line 205 along which normally closed fuel vapor storage canister vent valve (CVV) 213 is placed to selectively allow air to flow into and out of fuel vapor storage canister 202 from atmospheric port 255. Fuel vapors may be supplied to fuel vapor storage canister 202 via conduit 208 and normally open fuel tank vapor blocking valve (VBV) 219. Fuel vapors may be purged to engine intake manifold 44 via fuel vapor canister purge valve (CPV) 204 which allows fluidic communication between fuel vapor storage canister 202 and engine intake manifold 44 or intake 42 (shown in FIG. 1) via conduit 207.

Engine 10 includes a fuel rail 220 that supplies fuel to direct fuel injector 66. Fuel vapors may be inducted into intake manifold 44 or intake 42 when intake manifold pressure is below atmospheric pressure. Fuel 231 is supplied from fuel tank 230 by fuel pump 252 to fuel rail 220. Pressure in fuel tank 232 may be measured via fuel tank pressure transducer (FTPT) 241 and relayed to controller 12. Controller 12 may receive inputs from the sensors described in FIG. 1 as well as sensor 241. Controller 12 also activates and deactivates CPV 204, CVV 213, VBV 219, and pump 252 in response to fuel system and engine operating conditions.

Figure 4:
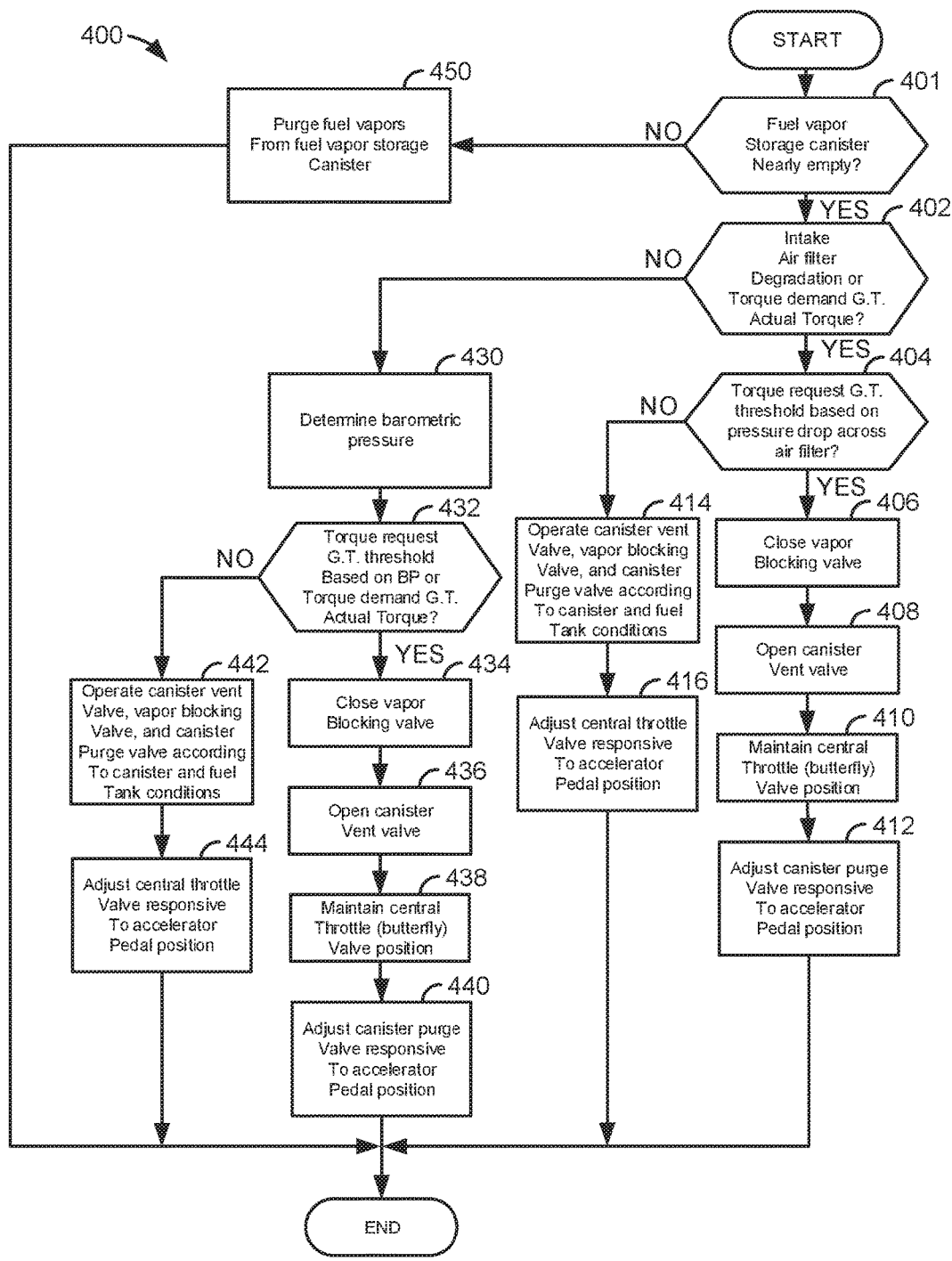
FIG. 4 is an example method for controlling an engine during conditions of low barometric pressure or while an engine air filter is degraded.

In one example, the system of FIG. 2 operates according to the method of FIG. 4 via executable instructions stored in non-transitory memory of controller 12. While engine 10 is operating, fuel vapors from fuel tank 230 may be stored in fuel vapor storage canister 202 in response to temperatures in fuel tank 230 increasing.

Fuel vapors from fuel tank 230 may push air out of normally open CVV 213 when temperature and/or pressure in fuel tank 230 is increasing. If engine 10 is operating while vapors are being directed to fuel vapor storage canister 202, CPV 204 may be opened so that fuel vapors are drawn into and combusted in engine 10. If engine 10 is not operating or if CPV 204 is closed, fuel vapor may flow into fuel vapor storage canister 202 if temperature and/or pressure in fuel tank 230 increases such that fuel vapors flow to and are stored in fuel vapor storage canister 202.

On the other hand, if engine 10 is not operating or if CPV 204 is closed while temperature and/or pressure in fuel tank 230 is decreasing, fuel vapors from fuel vapor canister 202 may condense in fuel tanks 230 when VBV 219 is open. VBV 219 may be a normally open valve that is closed when CPV is open to improve vacuum formation in canister 202, thereby improving evacuation of fuel vapors from fuel vapor storage canister 202. Thus, the fuel system shown in FIG. 2 provides a way of decreasing a volume of the fuel vapor emissions system that is purged so that fuel vapor canister purging may be improved.

Controller 12 may indicate a condition of degradation of the throttle, CPV, VBV, and/or CVV on a display panel 251. Alternatively, 251 may be a light or other device to indicate degradation within the system.

The system of FIGS. 1 and 2 provides for an engine system, comprising: an engine including an air intake and a throttle positioned along the air intake downstream of an air filter and upstream of an intake manifold; a fuel vapor storage canister; a canister purge valve positioned along a conduit extending from the fuel vapor storage canister to the intake manifold; an accelerator pedal; and a controller including executable instructions stored in non-transitory memory to adjust a position of the canister purge valve proportional to a position of the accelerator pedal in response to the air filter being degraded. The engine system further comprises a fuel vapor storage canister vent valve and a fuel tank vapor blocking valve. The engine system further comprises additional instructions to open the fuel vapor storage canister vent valve and closing a fuel tank vapor blocking valve in response to the air filter being degraded. The engine system further comprises additional instructions to maintain a position of the throttle while adjusting the position of the canister purge valve proportionate to the position of the accelerator pedal. The engine system further comprises additional instructions to adjust the position of the canister purge valve responsive to engine air flow greater than a threshold. The engine system further comprises additional instructions to adjust a central throttle in response to the position of the accelerator pedal in response to the air filter being degraded and engine air flow less than a threshold.

Referring now to FIG. 3, plots of various simulated signals during hypothetical vehicle operating conditions are shown. The operating sequence may be performed via the system of FIGS. 1 and 2 in cooperation with the method of FIG. 4. Vertical lines at times T0-T7 represent times of interest during the sequence. The plots in FIG. 3 are time aligned and occur at the same time.

The first plot from the top of FIG. 3 is a plot of barometric pressure versus time. The vertical axis represents barometric pressure and barometric pressure increases in the direction of the vertical axis arrow. Barometric pressure decreases with increasing altitude. The horizontal axis represents time and time increases from the left side of the figure to the right side of the figure.

The second plot from the top of FIG. 3 is a plot of CPV average opening amount. In one example, the CPV may be opened and closed at a frequency and duty cycle so that the CPV is open an average amount. Alternatively, the CPV may be adjusted to a plurality of positions between full open and full closed to provide the opening amount shown in the second plot. The CPV is closed when the trace is near the horizontal axis. The CPV is full open when the trace is near the vertical axis arrow. The horizontal axis represents time and time increases from the left side of the figure to the right side of the figure.

The third plot from the top of FIG. 3 is a plot of accelerator pedal position versus time. The vertical axis represents accelerator pedal position and the accelerator pedal position increases (e.g., is applied and displaced further from its base fully released position) in the directly of the vertical axis arrow. The horizontal axis represents time and time increases from the left side of the figure to the right side of the figure.

The fourth plot from the top of FIG. 3 is a plot of central throttle position versus time. The vertical axis represents throttle position and the throttle is open a greater amount when the trace is at a higher level near the vertical axis arrow. The horizontal axis represents time and time increases from the left side of the figure to the right side of the figure.

The fifth plot from the top of FIG. 3 is a plot of VBV operating state versus time. The VBV is open when the trace is at a higher level near the vertical axis arrow. The VBV is closed when the trace is at a lower level near the horizontal axis arrow. The horizontal axis represents time and time increases from the left side of the figure to the right side of the figure.

The sixth plot from the top of FIG. 3 is a plot of CVV operating state versus time. The CVV is open when the trace is at a higher level near the vertical axis arrow. The CVV is closed when the trace is at a lower level near the horizontal axis. The horizontal axis represents time and time increases from the left side of the figure to the right side of the figure.

At time T0, the barometric pressure is at a higher value indicating that the vehicle is at a lower altitude. The CPV opening amount is at a middle level, the accelerator pedal is applied at a middle level, the throttle is opened to a middle level, the vapor blocking valve is open, and the canister vent valve is closed. Fuel vapors are being purged from the fuel tank at this time.

Between time T0 and time T1, the CPV valve is ramped toward being closed in response to fuel vapors in the fuel tank being removed. The other signals remain at their respective levels.

At time T1, the CPV is fully closed and the VBV is closed to isolate the fuel tank from the fuel vapor storage canister. The CVV remains closed. The barometric pressure remains high and the accelerator pedal and throttle positions remain at their respective levels.

At time T2, the barometric pressure begins to decrease indicating that the vehicle is ascending a hill. As the barometric pressure decreases the engine power output decreases if air flow to the engine is not maintained. The vehicle driver (not shown) maintains the accelerator pedal position to request a same amount of torque as at time T0. The vehicle driver requests a driver demand torque via the accelerator pedal. The vapor blocking valve remains closed and the canister vent valve is closed.

Between time T2 and time T3, the throttle position is automatically increased to open further as barometric pressure is reduced so that the requested driver demand torque is provided by the engine. By opening the throttle further, engine air flow may be maintained to maintain engine torque output even though barometric pressure is decreasing as the vehicle travels to a higher altitude. The vapor blocking valve remains closed and the canister vent valve is also closed.

At time T3, the barometric pressure has decreased to a level where additionally opening the throttle does not increase engine air flow. Therefore, the CPV begins to open and the canister vent valve is opened so that air flows from an atmospheric port to the engine intake. The resistance to flow through the evaporative emissions system may be less than through the air filter and the throttle. Consequently, the amount of air provided to the engine may increase. This may also be the case when the air filter is at least partially clogged. If the accelerator pedal was being applied at these conditions, the CPV may be opened at a rate that is proportional to the rate of change in accelerator pedal position. The vapor blocking valve is held closed so that fuel vapors do not enter the engine. The canister vent valve is opened to allow air to pass from the atmosphere to the engine air intake. If vapors are known to be in the fuel vapor storage canister, the fuel vapors may be drawn into the engine before the canister purge valve is opened in response to barometric pressure and the driver demand torque.

Between time T3 and time T4, the barometric pressure continues to increase, so the CPV opening amount continues to increase to provide additional air to the engine. The accelerator pedal position remains at its position and the throttle position is also maintained. The VBV remains closed and the CPV remains open.

At time T4, the barometric pressure levels off at a lower level and the CPV is opened no further. The accelerator pedal position remains at its previous position and the throttle opening amount remains at its previous position. The VBV and CVV also remain in the previous positions.

At time T5, the barometric pressure begins to increase such that the air flow into the engine would increase but for the CPV starting to close in response to the increasing barometric pressure. The accelerator pedal, throttle position, VBV, and CVV remain in their respective positions.

Between time T5 and time T6, the CPV closes from nearly wide open to fully closed. By closing the CPV the engine torque increase due to rising barometric pressure may be prevented. The accelerator pedal and throttle remain at their respective positions. The VBV and CVV also remain at their respective positions.

At time T6, the barometric pressure has increased to a level where the central throttle begins to close to limit engine air flow so that the driver demand torque may be provided. The CPV remains closed and the VBV remain in its positions. The CVV is closed to isolate the fuel vapor storage canister from atmospheric pressure.

At time T7, the throttle stops closing and the VBV is opened to allow fuel vapors to enter the fuel vapor storage canister. The CPV remains closed and the CVV is opened to allow fuel vapors to enter the fuel vapor storage canister.

In this way, the CPV, VBV, and CVV may be adjusted to increase the possibility of maintaining engine torque when driver demand torque is constant and barometric pressure is increasing and decreasing. Further, if the engine is operated at altitude where barometric pressure is low and driver demand torque increases, the CPV may be opened proportionate to driver demand torque or accelerator pedal position to provide the requested driver demand torque.

Referring now to FIG. 4, an example flow chart for a method for controlling an engine during conditions of low barometric pressure or while an engine air filter is degraded is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world. The method of FIG. 4 may provide the sequence shown in FIG. 3.

At 401, method 400 judges if the fuel vapor storage canister has less than a threshold amount of fuel vapor (e.g., less than 5% of the amount of fuel vapor that may be stored in the fuel vapor storage canister). In one example, method 400 judges the amount of fuel vapor stored in the fuel vapor storage canister based on output of an oxygen sensor in the exhaust system. If method 400 judges that the amount of fuel vapor store in the fuel vapor storage canister is less than the threshold amount, the answer is yes and method 400 proceeds to 402. Otherwise, the answer is no and method 400 proceeds to 450.

At 450, method 400 gradually removes or purges fuel vapors from the fuel vapor storage canister. The fuel vapors may be purged via gradually opening the CPV and the CVV while the VBB is closed. Method 400 proceeds to exit after purging fuel vapors from the fuel vapor storage canister.

At 402, method 400 judges if engine air filter (e.g., 43 of FIG. 1) degradation is present or if the engine is not producing a desired amount of torque. In one example, an engine air filter may be determined to be degraded based on a pressure difference across the air filter. If the pressure difference across the air filter is greater than a threshold, it may be determined that the air filter is degraded. Desired engine torque based on accelerator pedal position may be compared to actual engine torque estimated based on engine air flow, engine speed, spark timing, and fuel amount. If desired engine torque is greater than actual engine torque by a threshold amount of torque, it may be determined that the engine is not producing the desired amount of torque. If method 400 judges that air filter degradation is present or if torque produced by the engine is less than a desired amount of torque by a threshold amount of torque, the answer is yes and method 400 proceeds to 404. Otherwise, the answer is no and method 400 proceeds to 430.

At 430, method 400 determines barometric pressure. Barometric pressure may be determined based on output of a sensor. Barometric pressure may be indicative of the vehicle and engine operating at higher and lower altitudes. Method 400 proceeds to 432.

At 432, method 400 judges if an engine torque request (e.g., a driver demand torque determined from accelerator pedal position) is greater than a threshold engine torque request or if desired engine torque is greater than actual engine torque by a threshold amount. The threshold engine torque request may be empirically determined and stored to memory. Further, the threshold engine torque request may be based on barometric pressure. For example, at higher barometric pressures, the torque threshold may be the maximum engine torque at the engine's present speed so that the CPV is not opened. However, at lower barometric pressures, the torque threshold may be less than the maximum engine torque at the engine's present speed so that the CPV may be opened to increase air flow responsive to the demanded torque and barometric pressure. If method 400 judges that the engine torque request is greater than the threshold or if desired engine torque is greater than actual engine torque by a threshold amount of torque, the answer is yes and method 400 proceeds to 434. Otherwise, the answer is no and method 400 proceeds to 442.

In another example, method 400 may judge if barometric pressure is less than a threshold pressure and driver demand torque is greater than a threshold torque. If so, the answer is yes and method 400 proceeds to 434. Otherwise, the answer is no and method 400 proceeds to 442.

At 434, method 400 closes the VBV to prevent fuel vapors from entering the engine from the fuel tank. Method 400 proceeds to 436 after closing the VBV.

At 436, method 400 opens the CVV to allow air to enter the engine from the atmospheric port in the evaporative emission system. Method 400 proceeds to 438 after the CVV is opened.

At 438, method 400 maintains a current position of the engine's central throttle so that the throttle does not have to close from a wider open position where adjusting the throttle does not reduce the engine air flow at the present barometric pressure or altitude. Method 400 proceeds to 440.

At 440, method 400 adjusts the CPV responsive to accelerator pedal position when barometric pressure is not changing. For example, if the accelerator pedal is increasing, the CPV opening amount may be proportionately increased with the increase in the accelerator pedal position. However, if barometric pressure is changing, the position of the canister purge valve may also be changed responsive to barometric pressure so that a desired engine air flow may be provided based on a desired driver demand torque. In one example, air flow through the CPV is determined based on CPV duty cycle or position versus pressure drop across the CPV. In particular, a table or function indexed by CPV position and pressure drop across the CPV outputs an empirically determined CPV air flow. The CPV air flow is adjusted so that CPV air flow plus air flow through the engine throttle equals a desired air flow into the engine. The desired air flow into the engine may be empirically determined and based on a desired torque. For example, driver demand torque is determined based on accelerator pedal position, and driver demand torque is used to index a table of empirically determined engine torque values. The table outputs a torque value based on driver demand torque. The CPV is adjusted to the position that provides the desired engine air flow in cooperation with air flow through the central throttle. Method 400 proceeds to exit.

At 442, method 400 operates the CVV, VBV, CPV, according to fuel tank and fuel vapor storage canister conditions. For example, if the fuel vapor storage canister is full of vapor, the fuel vapor storage canister is purged of fuel vapors as previously discussed. If the fuel tank is holding a large amount of vapor, the fuel vapors from the fuel tank may be stored in the fuel vapor storage canister. Method 442 proceeds to 444.

At 444, method 400 adjusts the central throttle responsive to a position of the accelerator pedal. In one example, the accelerator pedal position is converted into a desired engine torque and the desired engine torque is converted into a desired fuel amount and a desired engine air flow amount based on the desired engine torque and stoichiometric combustion. The throttle is adjusted to provide the desired engine air flow amount. Method 400 proceeds to exit.

At 404, method 400 judges if an engine torque request (e.g., a driver demand torque determined from accelerator pedal position) is greater than a threshold engine torque request. The threshold engine torque request may be empirically determined and stored to memory. Further, the threshold engine torque request may be based on a pressure drop across the engine air filter. For example, at lower pressure drops across the engine air filter, the torque threshold may be the maximum engine torque at the engine's present speed so that the CPV is not opened. However, at higher pressure drops across the engine air filter, the torque threshold may be less than the maximum engine torque at the engine's present speed so that the CPV may be opened to increase air flow responsive to the demanded torque. If method 400 judges that the engine torque request is greater than the threshold, the answer is yes and method 400 proceeds to 406. Otherwise, the answer is no and method 400 proceeds to 414.

At 406, method 400 closes the VBV to prevent fuel vapors from entering the engine from the fuel tank. Method 400 proceeds to 408 after closing the VBV.

At 408, method 400 opens the CVV to allow air to enter the engine from the atmospheric port in the evaporative emission system. Method 400 proceeds to 410 after the CVV is opened.

At 410, method 400 maintains a current position of the engine's central throttle so that the throttle does not have to close from a wider open position where adjusting the throttle does not reduce the engine air flow at the present barometric pressure or altitude. Method 400 proceeds to 412.

At 412, method 400 adjusts the CPV responsive to accelerator pedal position when the requested engine torque is greater than the threshold torque. For example, if the accelerator pedal is increasing, the CPV opening amount may be proportionately increased with the increase in the accelerator pedal position. The CPV is adjusted to provide a desired engine air flow. In one example, air flow through the CPV is determined based on CPV duty cycle or position versus pressure drop across the CPV. In particular, a table or function indexed by CPV position and pressure drop across the CPV outputs an empirically determined CPV air flow. The CPV air flow is adjusted so that CPV air flow plus air flow through the engine throttle equals a desired air flow into the engine. The desired air flow into the engine may be empirically determined and based on a desired torque. For example, driver demand torque is determined based on accelerator pedal position, and driver demand torque is used to index a table of empirically determined engine torque values. The table outputs a torque value based on driver demand torque. The CPV is adjusted to the position that provides the desired engine air flow in cooperation with air flow through the central throttle. Method 400 proceeds to exit.

At 414, method 400 operates the CVV, VBV, CPV, according to fuel tank and fuel vapor storage canister conditions. For example, if the fuel vapor storage canister is full of vapor, the fuel vapor storage canister is purged of fuel vapors as previously discussed. If the fuel tank is holding a large amount of vapor, the fuel vapors from the fuel tank may be stored in the fuel vapor storage canister. Method 442 proceeds to 416.

At 416, method 400 adjusts the central throttle responsive to a position of the accelerator pedal. In one example, the accelerator pedal position is converted into a desired engine torque and the desired engine torque is converted into a desired fuel amount and a desired engine air flow amount based on the desired engine torque and stoichiometric combustion. The throttle is adjusted to provide the desired engine air flow amount. Method 400 proceeds to exit.

In this way, greater amounts of engine air flow may be provided during conditions of air filter degradation or low barometric pressures. The increased engine air amounts may improve engine performance and the engine's progression of providing torque may continue to be based on accelerator pedal position.

Thus, the method of FIG. 4 provides for an engine control method, comprising: opening a fuel vapor storage canister vent valve and closing a fuel tank vapor blocking valve via a controller in response to an indication of barometric pressure less than a first threshold and a driver demand torque greater than a second threshold. The method includes where the fuel vapor canister vent valve is positioned along a conduit extending between atmosphere and a fuel vapor storage canister. The method includes where the fuel tank vapor blocking valve is positioned along a conduit extending between a fuel tank and a fuel vapor storage canister. The method further comprises adjusting a position of a canister purge valve proportionate to a position of an accelerator pedal. The method further comprises holding an engine air inlet throttle in a fixed position in response to the barometric pressure less than the first threshold and the driver demand torque greater than the second threshold. The method includes the driver demand torque is based on a position of an accelerator pedal. The method further comprises opening a fuel vapor storage canister vent valve and closing a fuel tank vapor blocking valve via a controller in further response to an engine air intake filter not being degraded.

The method of FIG. 4 also provides for an engine control method, comprising: opening a fuel vapor storage canister vent valve and closing a fuel tank vapor blocking valve via a controller in response to degradation of an engine air intake filter. The method includes where the engine air intake filter is positioned upstream of a central throttle butterfly valve. The method further comprises adjusting a position of a canister purge valve in response to a position of an accelerator pedal. The method further comprises holding a position of a throttle constant while adjusting the position of the canister purge valve. The method further comprises adjusting a position of a canister purge valve in response to a driver demand torque. The method includes where the fuel vapor storage canister vent valve is positioned along a conduit between a fuel vapor storage canister and atmospheric pressure vent. The method further comprises determining degradation of the engine air intake filter based on a pressure drop across the engine air intake filter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
   operating an engine with barometric pressure less than a first threshold and a driver demand torque greater than a second threshold; and
   opening a fuel vapor storage canister vent valve and closing a fuel tank vapor blocking valve via a controller in response to an indication of barometric pressure less than the first threshold while the driver demand torque is greater than the second threshold.

2. The method of claim 1, where the fuel vapor storage canister vent valve is positioned along a conduit extending between atmosphere and a fuel vapor storage canister, and further comprising:
   maintaining a position of a throttle and adjusting a canister purge valve responsive to an accelerator pedal position in response to the indication of barometric pressure less than the first threshold and driver demand torque greater than the second threshold; and
   adjusting the position of the throttle responsive to the accelerator pedal position in response to the driver demand torque not being greater than the second threshold.

3. The method of claim 1, where the fuel tank vapor blocking valve is positioned along a conduit extending between a fuel tank and a fuel vapor storage canister.

4. The method of claim 1, further comprising adjusting a position of a canister purge valve proportionate to a position of an accelerator pedal.

5. The method of claim 4, further comprising holding an engine air inlet throttle in a fixed position in response to the barometric pressure less than the first threshold and the driver demand torque greater than the second threshold.

6. The method of claim 1, where the driver demand torque is based on a position of an accelerator pedal.

7. The method of claim 1, further comprising opening the fuel vapor storage canister vent valve and closing the fuel tank vapor blocking valve via a controller in further response to an engine air intake filter not being degraded.

8. An engine control method, comprising:
   judging degradation of an engine air intake filter; and
   opening a fuel vapor storage canister vent valve and closing a fuel tank vapor blocking valve via a controller in response to the degradation of the engine air intake filter.

9. The method of claim 8, where the engine air intake filter is positioned upstream of a central throttle butterfly valve.

10. The method of claim 8, further comprising adjusting a position of a canister purge valve in response to a position of an accelerator pedal in response to degradation of the engine air intake filter.

11. The method of claim 10, further comprising holding a position of a throttle constant while adjusting the position of the canister purge valve in response to degradation of the engine air intake filter.

12. The method of claim 8, further comprising adjusting a position of a canister purge valve in response to a driver demand torque.

13. The method of claim 8, where the fuel vapor storage canister vent valve is positioned along a conduit between a fuel vapor storage canister and an atmospheric pressure vent.

14. The method of claim 8, further comprising determining degradation of the engine air intake filter based on a pressure drop across the engine air intake filter.

15. An engine system, comprising:
an engine including an air intake and a throttle positioned along the air intake downstream of an air filter and upstream of an intake manifold;
a fuel vapor storage canister;
a canister purge valve positioned along a conduit extending from the fuel vapor storage canister to the intake manifold;
an accelerator pedal; and
a controller including executable instructions stored in non-transitory memory to judge the air filter is degraded and adjust a position of the canister purge valve proportional to a position of the accelerator pedal in response to the air filter being degraded.

16. The engine system of claim 15, further comprising a fuel vapor storage canister vent valve and a fuel tank vapor blocking valve.

17. The engine system of claim 16, further comprising additional instructions to open the fuel vapor storage canister vent valve and close a fuel tank vapor blocking valve in response to the air filter being degraded.

18. The engine system of claim 15, further comprising additional instructions to maintain a position of the throttle while adjusting the position of the canister purge valve proportionate to the position of the accelerator pedal.

19. The engine system of claim 15, further comprising additional instructions to adjust the position of the canister purge valve responsive to engine air flow greater than a threshold.

20. The engine system of claim 15, further comprising additional instructions to adjust the throttle in response to the position of the accelerator pedal in response to the air filter being degraded and engine air flow less than a threshold.

* * * * *